F. K. JOHN.

Springs.

No. 5,685. Reissued Dec. 16, 1873.

Witnesses.
John Becker
Geo Haynes

Fritz K. John
by Attorneys
Brown & Allen

AM. PHOTO-LITHOGRAPHIC Co. N.Y. (OSBORNE'S PROCESS.)

UNITED STATES PATENT OFFICE.

FRITZ K. JOHN, OF MOSCOW, RUSSIA.

IMPROVEMENT IN SPRINGS.

Specification forming part of Letters Patent No. 134,673, dated January 7, 1873; reissue No. 5,685, dated December 16, 1873; application filed November 24, 1873.

*To all whom it may concern:*

Be it known that I, FRITZ K. JOHN, a citizen of Germany, but now residing at Moscow, in the Empire of Russia, have invented a new and useful Improvement in Springs; and I do hereby declare that the following is a full, clear, and exact description of the same, reference being had to the accompanying drawing forming part of this specification, and in which—

Figure 4:
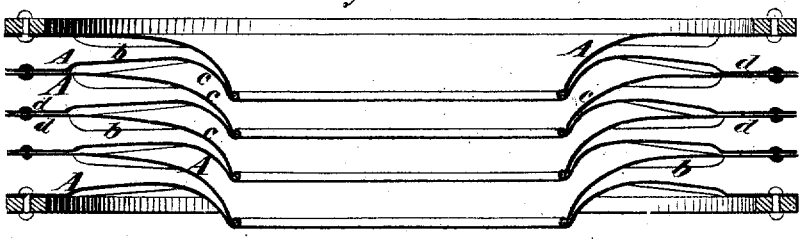
Figure 1:
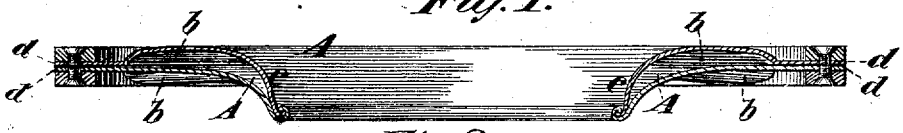
Figure 2:
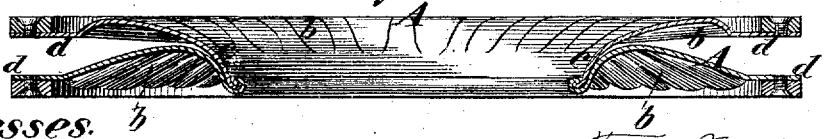

Figure 1 represents a transverse section of a pair of plates, composing a spring in its closed condition; Fig. 2, a like view of said spring in its expanded condition, and Fig. 3 a face view of the same. Fig. 4 is a transverse section of a cylinder of such plates.

Similar letters of reference indicate corresponding parts.

This invention consists in a spring composed of one or more corrugated disk-shaped steel plates, open at their center, and bent so as to have a conical form, with flanges on their inside and outside edges, the same forming a durable, light, and efficient spring, applicable to a variety of purposes, including railroad-car buffers, gages for measuring the elastic force of different gases or fluids, and to certain parts of steam and other engines or pumps.

Figure 3:
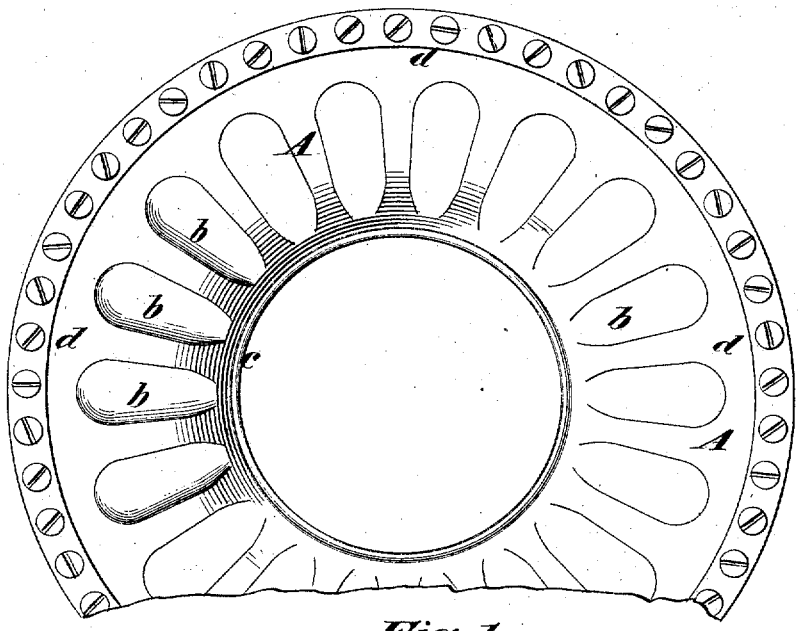

Referring in the first instance to Figs. 1, 2, and 3 of the drawing, A A represent annular steel plates, formed with corrugations *b b*, and with inside and outside flanges *c d*, said plates being bent at their eyes or centers, and made to enter or connect at their inner edges one with the other, and so as to give a conical shape or projection to the spring on its one side or face. The corrugations *b b* may be variously shaped and differ in size and number, but should be radially arranged between the inner and outer margins of the plates. By means of said corrugations, in conjunction with the conical construction of the plates at their eye or center, an elastic action, combined with great durability and strength, is obtained for the plates, and their easy motion in an axial direction, either when exposed to compression or extension, provided for.

By arranging a number of these plates in pairs, and riveting each pair together at their outer margins, and so that the one plate of one pair connects at its bent eye or center with the adjacent plate of the next pair, as represented in Fig. 4, a very efficient cylinder of springs is obtained, and which is applicable either for compression or expansion in a plane or planes lying at right angles to the axis of said cylinder.

Having thus described my invention, what I claim, and desire to secure by Letters Patent, is—

A spring composed of two or more annular disk-shaped plates, with radially-arranged corrugations *b b* between outside and inside flanges *c d*, and bent to assume a conical shape, and alternately connected around their inner and outer peripheries, substantially as shown and described.

FRITZ K. JOHN.

Witnesses:

LUDWIG NOENARIUR,
ALBERT J. DE ZEYH.